United States Patent
Satou (10) Patent No.: US 11,613,012 B2
(45) Date of Patent: Mar. 28, 2023

(54) ROBOT CONTROLLER

(71) Applicant: Fanuc Corporation, Yamanashi (JP)

(72) Inventor: Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 365 days.

(21) Appl. No.: 16/936,877

(22) Filed: Jul. 23, 2020

(65) Prior Publication Data
US 2021/0053218 A1 Feb. 25, 2021

(30) Foreign Application Priority Data

Aug. 23, 2019 (JP) .............................. JP2019-152670

(51) Int. Cl.
*B25J 9/16* (2006.01)
*G01L 3/00* (2006.01)
*G01L 5/00* (2006.01)

(52) U.S. Cl.
CPC .............. *B25J 9/1633* (2013.01); *G01L 3/00* (2013.01); *G01L 5/0076* (2013.01)

(58) Field of Classification Search
CPC ......... B25J 9/1687; G01L 3/00; G01L 5/0076
See application file for complete search history.

(56) References Cited

U.S. PATENT DOCUMENTS

| | | | | |
|---|---|---|---|---|
| 5,835,693 A | * | 11/1998 | Lynch | B25J 9/1605 345/473 |
| 2008/0267737 A1 | * | 10/2008 | Hatanaka | B25J 9/1687 901/27 |
| 2016/0354925 A1 | * | 12/2016 | Shimodaira | B25J 9/1633 |
| 2016/0354933 A1 | * | 12/2016 | Sato | B25J 9/1633 |
| 2018/0222056 A1 | * | 8/2018 | Suzuki | B25J 9/0096 |
| 2018/0361591 A1 | * | 12/2018 | Okamoto | B25J 9/1602 |

FOREIGN PATENT DOCUMENTS

| | | |
|---|---|---|
| JP | H06-262563 A | 9/1994 |
| JP | 2009-269155 A | 11/2009 |
| JP | 5203037 B2 | 6/2013 |

* cited by examiner

*Primary Examiner* — Abby Y Lin
*Assistant Examiner* — Dylan M Katz
(74) *Attorney, Agent, or Firm* — Shackelford, Bowen, McKinley & Norton, LLP (57) ABSTRACT

A robot controller that moves a first workpiece mounted on a robot with respect to a second workpiece, the robot having a sensor for detecting one of magnitude of force acting on the first workpiece and magnitude of torque acting on the robot, the robot controller including a calculation unit configured to calculate a force between the first workpiece and the second workpiece and a moment on the first workpiece, based on the magnitude of the force or the torque, a controller carrying out force control so that the calculated force and the moment correspond to a predetermined force and moment, and a display displaying at least one of a velocity of the first workpiece and an angular velocity, the velocity and the angular velocity occurring as a result of control by the controller, the velocity and the angular velocity being overlapped on an image of the robot.

9 Claims, 9 Drawing Sheets

ROBOT CONTROLLER

CROSS-REFERENCE TO RELATED APPLICATIONS

This application is based on and claims priority to Japanese Patent Application No. 2019-152670 filed on Aug. 23, 2019, the content of which is incorporated herein by reference in its entirety.

TECHNICAL FIELD

The present disclosure relates to a robot controller.

BACKGROUND ART

When a robot is used to carry out a task such as polishing, deburring, or precise fitting of a plurality of workpieces, a force or a moment acting on the robot is detected using a force detector such as a force sensor or a load cell. Then, movements of the robot are controlled so that the force or the moment detected by the force detector becomes a desired value (cf. PTL 1).

When an assembly task or a fitting task ends up in failure, or quality of polishing or deburring is not good, there is a case in which confirmation of a magnitude or a direction of the force is desired in order to confirm or improve the situation. In the tasks using the robot, a force detected by the force detector is often graphically represented, in order to confirm a force acting on the robot.

CITATION LIST

Patent Literature

Japanese Unexamined Patent Application, Publication No. H06-262563

SUMMARY OF INVENTION

One aspect of the present disclosure provides a robot controller that causes a first workpiece mounted on a distal end of a robot to relatively move with respect to a second workpiece, the robot having a sensor for detecting one of magnitude of force acting on the first workpiece and magnitude of torque acting on the robot, the robot controller including, a calculation unit configured to calculate a force acting on a contact point between the first workpiece and the second workpiece and a moment acting on the first workpiece, based on one of the magnitude of the force and the magnitude of the torque detected by the sensor, a controller configured to carry out force control so that the force and the moment calculated by the calculation unit correspond to a predetermined force and a predetermined moment, and a display configured to display at least one of a velocity of the first workpiece and an angular velocity around a reference point set for the first workpiece, the velocity and the angular velocity occurring as a result of control by the controller, the one of the velocity and the angular velocity being overlapped on an image of the robot.

DESCRIPTION OF EMBODIMENTS

Hereinafter, a robot controller 1 according to one embodiment of the present disclosure will be described with reference to the drawings.

Figure 1:
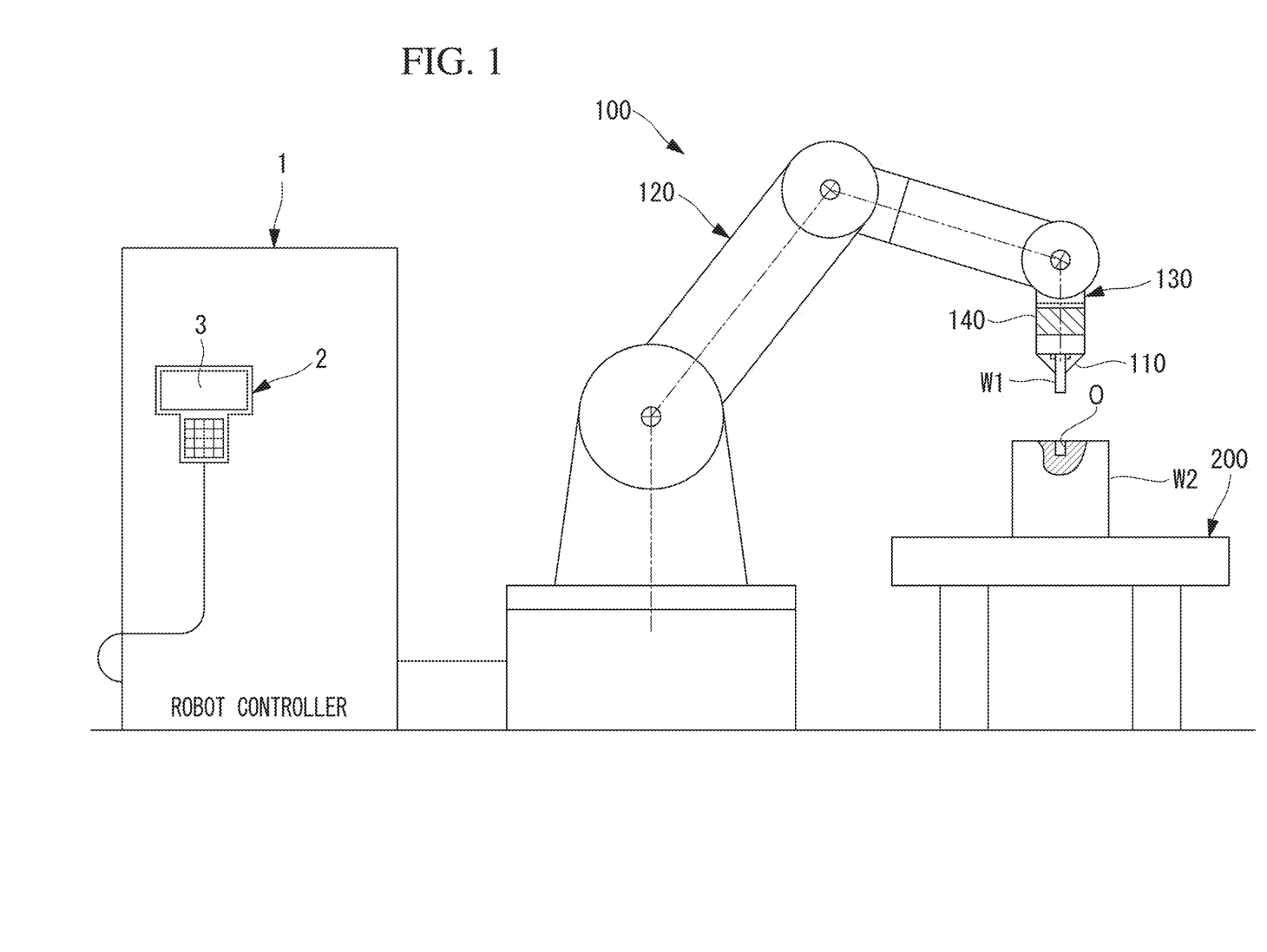
FIG. 1 is an overall configurational view illustrating a robot system including a robot controller according to one embodiment of the present disclosure.

As shown in FIG. 1, the robot controller 1 according to this embodiment is a device that controls a robot 100 having a hand 110 for holding a columnar first workpiece W1, for example.

The robot 100 carries out a fitting task, with which the first workpiece W1 held by the hand 110 is fitted into a hole O defined in a second workpiece W2 fixed to a work table 200.

However, the present disclosure is also applicable to robots that carry out other tasks during which a force is generated, such as a deburring task, a thread tightening task, and the like, to a second workpiece as a work target.

The robot 100 is a six-axis articulated type robot, for example, and includes an arm 120, a wrist unit 130 disposed at a distal end of the arm 120, and the hand 110 mounted on a distal end of the wrist unit 130. Further, between the wrist unit 130 and the hand 110 of the robot 100, a six-axis force sensor (sensor) 140 that detects a force acting on the hand 110 is provided at a portion indicated by hatching. The force sensor 140 detects forces in three axial directions that are orthogonal to each other, as well as moments around these three axes.

Information on the forces detected by the force sensor 140 is transmitted to the robot controller 1. The robot controller 1 carries out the force control so that a force acting between the first workpiece W1 and the second workpiece W2 becomes a previously set magnitude. As a control method for the force control, known impedance control, damping control, hybrid control, or the like may be applied.

As shown in FIG. 1, the robot controller 1 according to this embodiment is connected to a teach pendant (display) 2 for confirming and setting of teaching of an operation program to the robot 100, or various conditions. A monitor 3 of the teach pendant 2 is able to show simulated images or videos of the robot 100, the work table 200, the first workpiece W1, and the second workpiece W2. In the case of videos, an image of the robot 100 moves along with an actual movement of the robot 100.

While the teach pendant 2 is shown as an example of a display, the display may be provided in a main body of the robot controller 1, or a personal computer, a tablet terminal, a mobile terminal, or the like may be used as a display.

Figure 2:
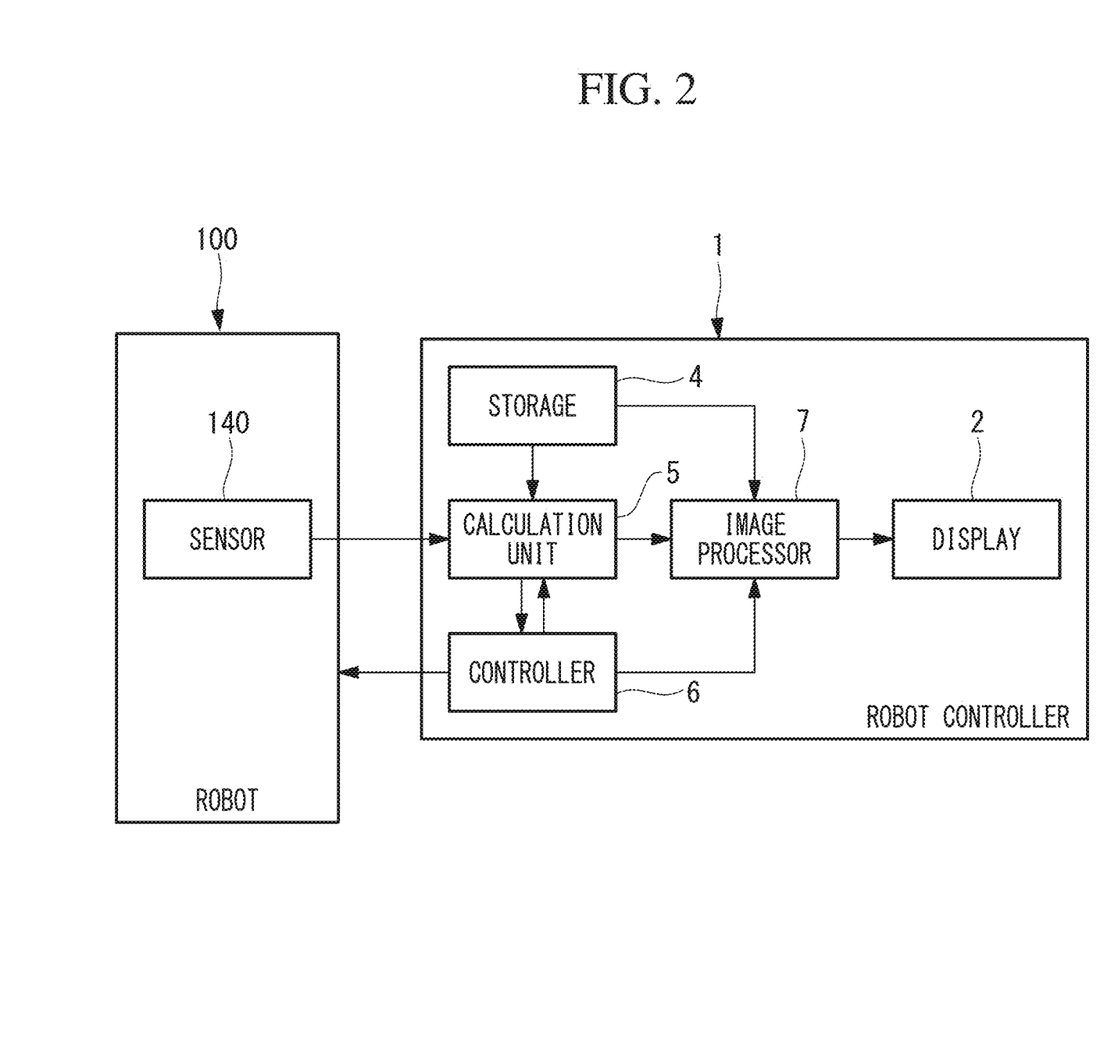
FIG. 2 is a block diagram illustrating the robot controller shown in FIG. 1.

As shown in FIG. 2, the robot controller 1 according to this embodiment includes a storage 4, a calculation unit 5, a controller 6, and an image processor 7.

The storage 4 stores image information used for structuring an image of the robot 100 based on geometric parameters of the robot 100 and state variables of the robot 100.

The calculation unit 5 calculates a force acting on a contact point between the first workpiece W1 and the second workpiece W2 and a moment acting on the first workpiece W1, based on a force detected by the force sensor 140, the geometric parameters stored in the storage 4, and the state variables calculated by the controller 6.

The geometric parameters include dimensions of lengths of each link of the robot 100.

The state variables include a position, a velocity, or an acceleration rate of each joints of the robot 100 calculated in the control by the controller 6.

The controller 6 performs a force control of the robot 100 so that the force and the moment calculated by the calculation unit 5 becomes predetermined values.

Figure 3:
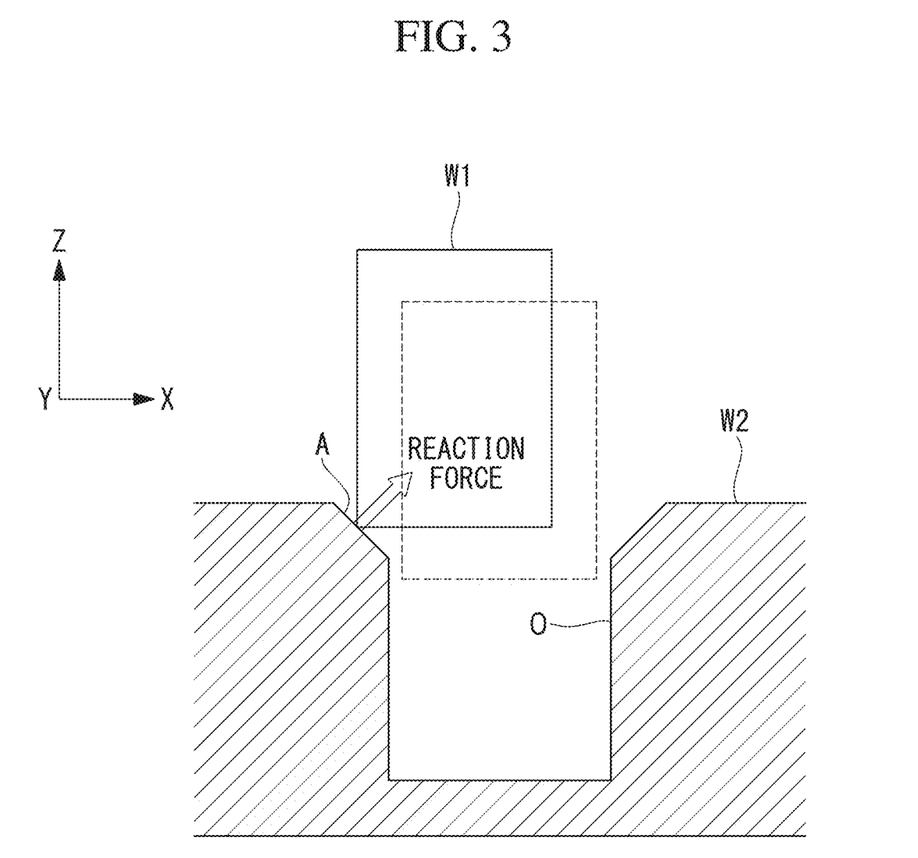
FIG. 3 is a view illustrating position correction in force control by the robot controller shown in FIG. 1.

Specifically, as shown in FIG. 3, when a position of the first workpiece W1 defined by a teaching program is displaced with respect to the second workpiece W2 fixed on the work table 200, the first workpiece W1 is brought into contact with the second workpiece W2 while moving and the first workpiece W1 receives a reaction force from the second workpiece W2. A chamfered portion A is provided in an opening of the hole O of the second workpiece W2, and when the first workpiece W1 is brought into contact with the chamfered portion A, the robot controller 1 operates the robot 100 so the reaction force becomes a predetermined magnitude, and the first workpiece W1 moves to a position shown by a dashed line following the chamfered portion A.

Further, assuming that a left-right direction in FIG. 3 is an X direction, in the damping control, a velocity command in the X direction is calculated so as to satisfy an expression (1) below.

$$Vx = D1 \cdot (Fx - Fdx) \quad (1)$$

Here,

Vx is a velocity command in the X direction,

Fx is a reaction force (a value detected by the force sensor 140),

Fdx is a target force in the X direction, and

D1 is a coefficient.

In particular, assuming that the target force is 0, the expression (1) is as expression (2) below, and while a rightward force Fx is occurring, a velocity command proportional to a magnitude of the force is generated, and the robot 100 and the first workpiece W1 move to a rightward side in the figure.

$$Vx = D1 \cdot Fx \quad (2)$$

Figure 4:
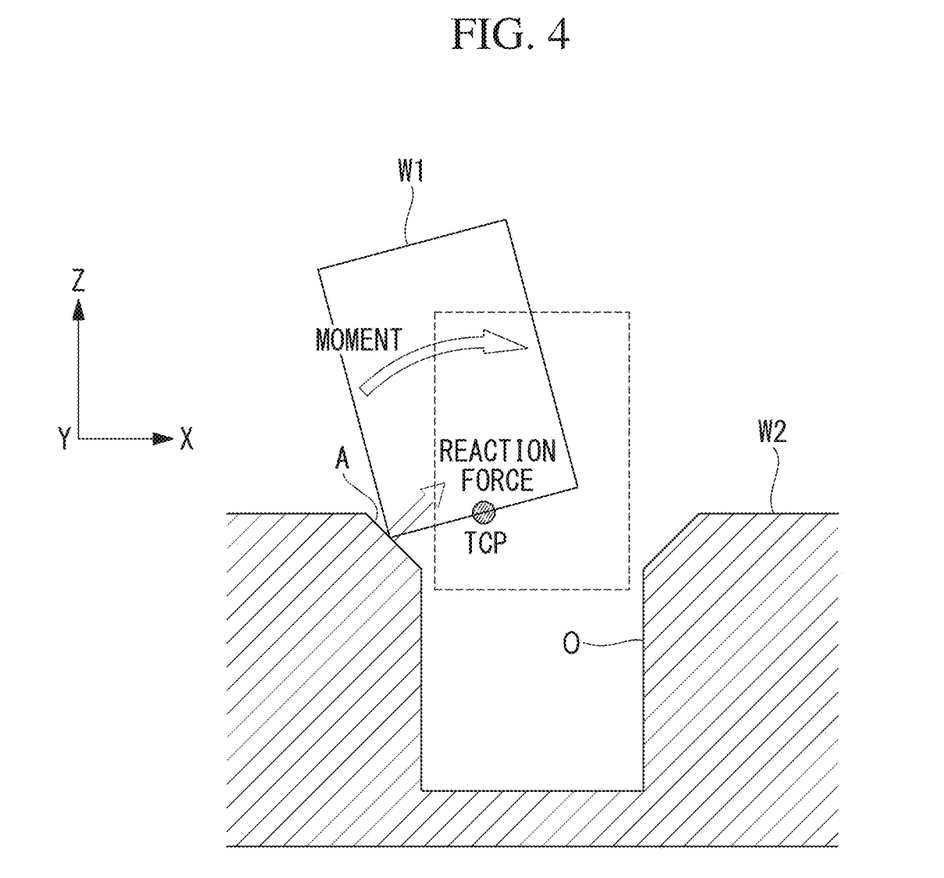
FIG. 4 is a view illustrating posture correction in force control by the robot controller shown in FIG. 1.

Further, as shown in FIG. 4, when a position and a posture of the first workpiece W1 defined by a teaching program are displaced with respect to the second workpiece W2 fixed to the work table 200, the first workpiece W1 is brought into contact with the second workpiece W2 while moving and the first workpiece W1 receives a reaction force and a moment from the second workpiece W2. When the first workpiece W1 whose posture is displaced is brought into contact with the chamfered portion A provided in the opening of the hole O of the second workpiece W2, the robot controller 1 operates the robot 100 so the reaction force and the moment become predetermined magnitudes, and the first workpiece W1 moves to a position indicated by a dashed line.

Further, assuming that a right-left direction in FIG. 4 is an X direction and a vertical direction in the drawing is a Y direction, in the damping control, a velocity command and an angular velocity command are calculated so as to satisfy the expression (1) and an expression (3) below.

$$Ay = D2 \cdot (My - Mdy) \quad (3)$$

Here,

Ay is an angular velocity command around the Y axis,

My is a moment around the Y axis (a value detected by the force sensor 140) with TCP as its center, Mdy is a target moment around the Y axis, and D2 is a coefficient.

In particular, assuming that the target moment around the Y axis is 0, the expression (3) becomes as shown in an expression (4) below, and while a moment My in a direction of an arrow is occurring, an angular velocity command proportional to a magnitude of the moment is generated, and the robot 100 and the first workpiece W1 move in the direction of the arrow.

$$Ay = D2 \cdot My \quad (4)$$

At the same time, as the velocity command in the X direction is generated due to effects of the expression (1) and expression (2), the robot 100 operates at the velocity and the angular velocity combining these.

Using the image information stored in the storage 4, the image processor 7 structures an image of the robot 100 at this time point, based on state variables such as positions, velocities, acceleration rates, or the like of the joints of the robot 100 obtained from the controller 6.

Figure 5:
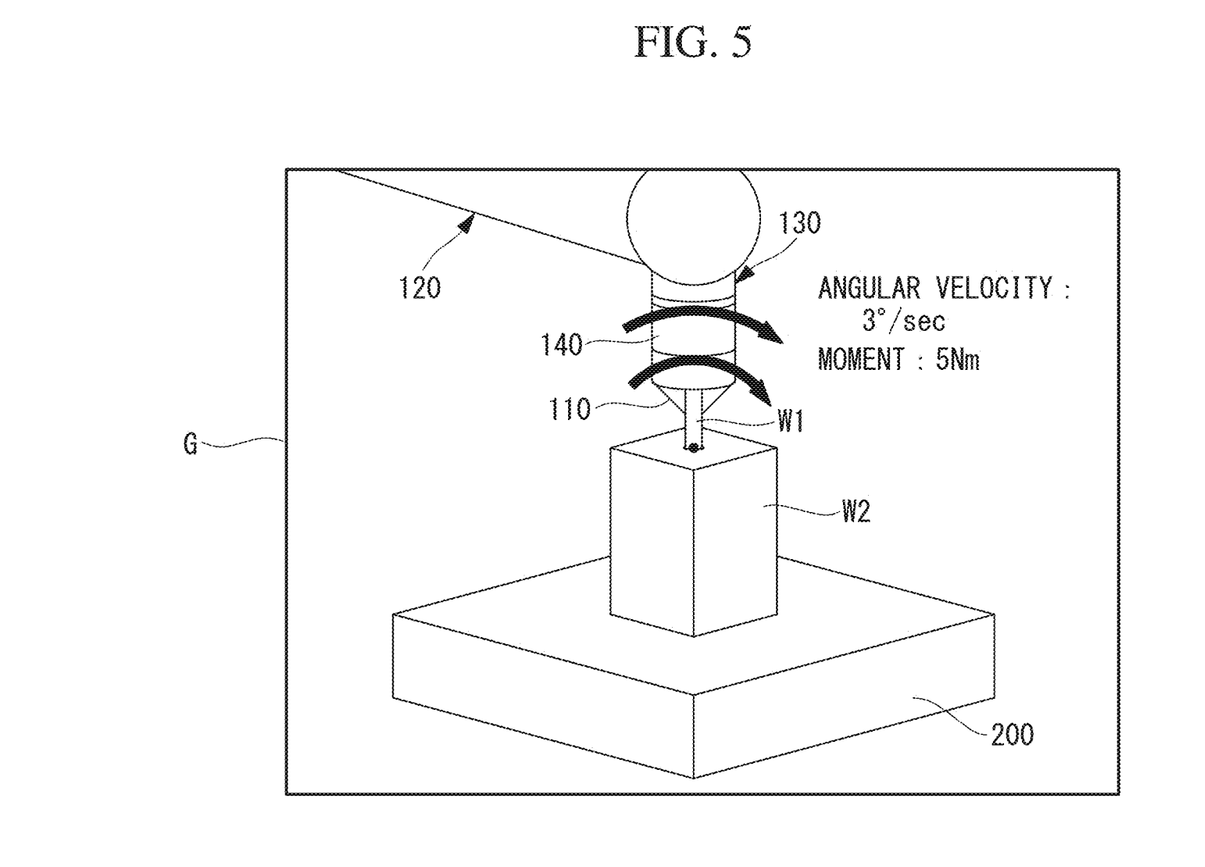
FIG. 5 is an example representation of an angular velocity shown by the robot controller shown in FIG. 1.
Figure 6:
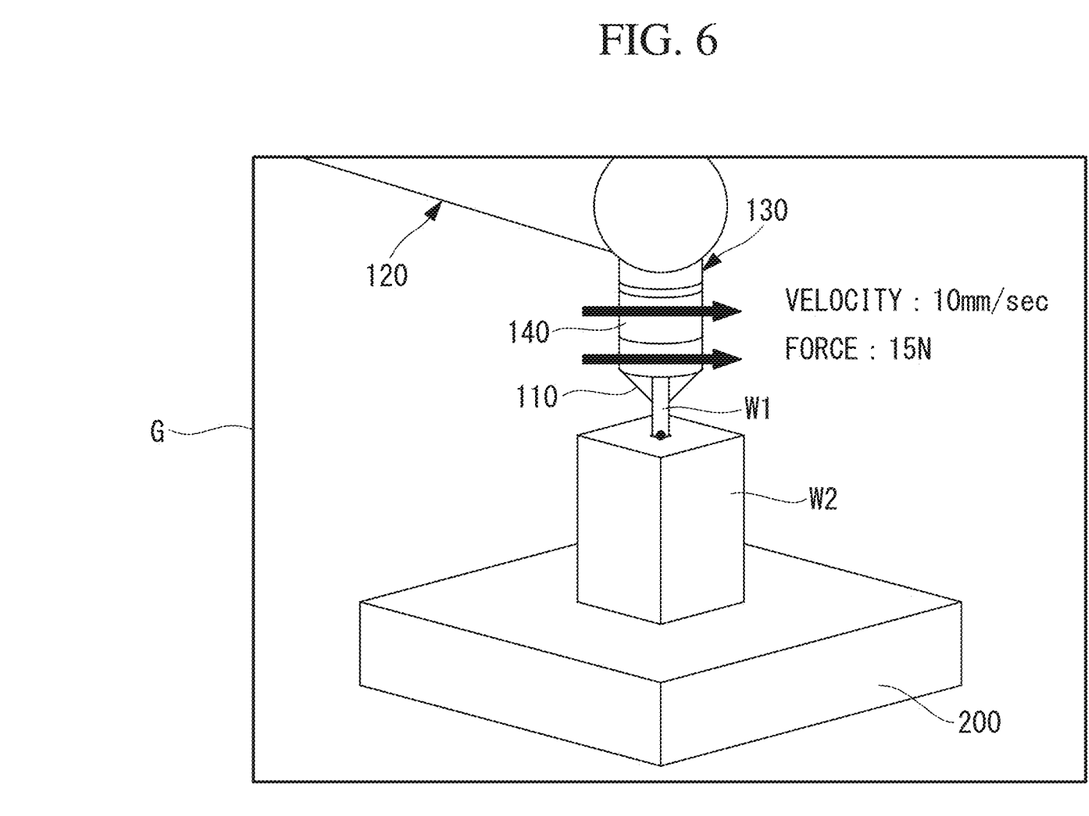
FIG. 6 is an example representation of a velocity shown by the robot controller shown in FIG. 1.

Further, the image processor 7 creates a composite image G in which directions and magnitudes of the force, the velocity, the moment, and the angular velocity calculated by the calculation unit 5 are overlapped on the image of the robot 100. As shown in FIG. 5 or FIG. 6, the directions and the magnitudes of the velocity or the angular velocity are overlapped on the image of the robot 100 by arrows and letters. The created composite image G is shown in the monitor 3 of the teach pendant 2.

Figure 7:
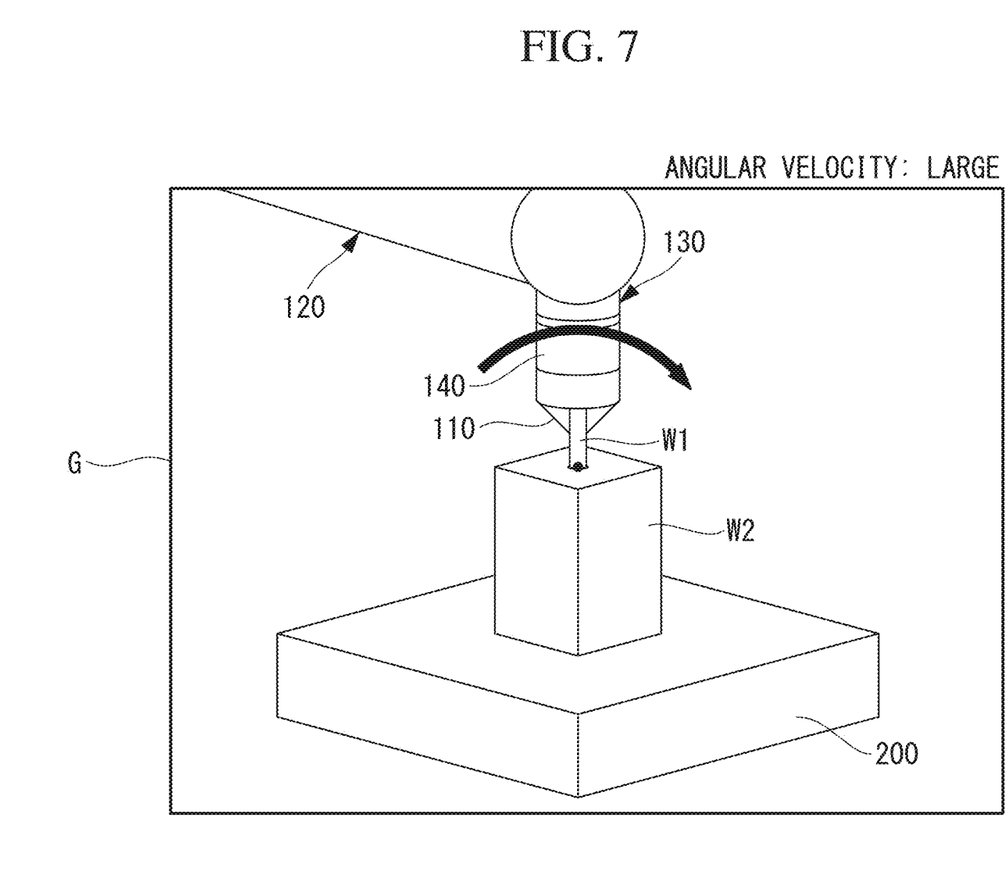
FIG. 7 is an example representation of a case in which the angular velocity shown in FIG. 5 is large.
Figure 8:
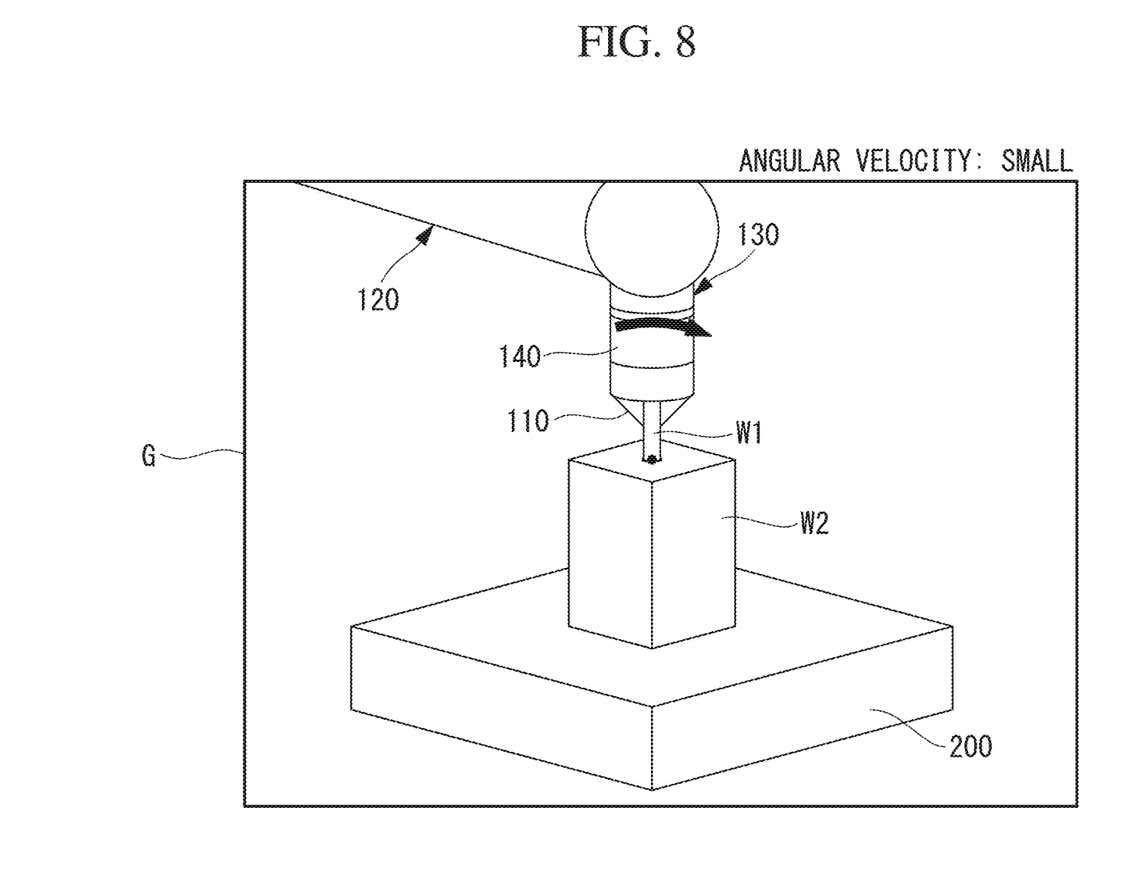
FIG. 8 is an example representation of a case in which the angular velocity shown in FIG. 5 is small.

One example of a display method of the velocity or the angular velocity is a display method using arrows as shown in FIG. 5 or FIG. 6. As shown in FIG. 7 or FIG. 8, the direction of the angular velocity represents a direction of change in the posture of the robot 100, and represented by the direction of the arrow. Further, as shown in FIG. 6, the direction of the velocity represents a direction of change in the position of the robot 100, which is represented by the direction of the arrow. Moreover, the magnitude of the velocity or the angular velocity represents a moving velocity of the robot 100, and may be represented by a length of an arrow.

Figure 9:
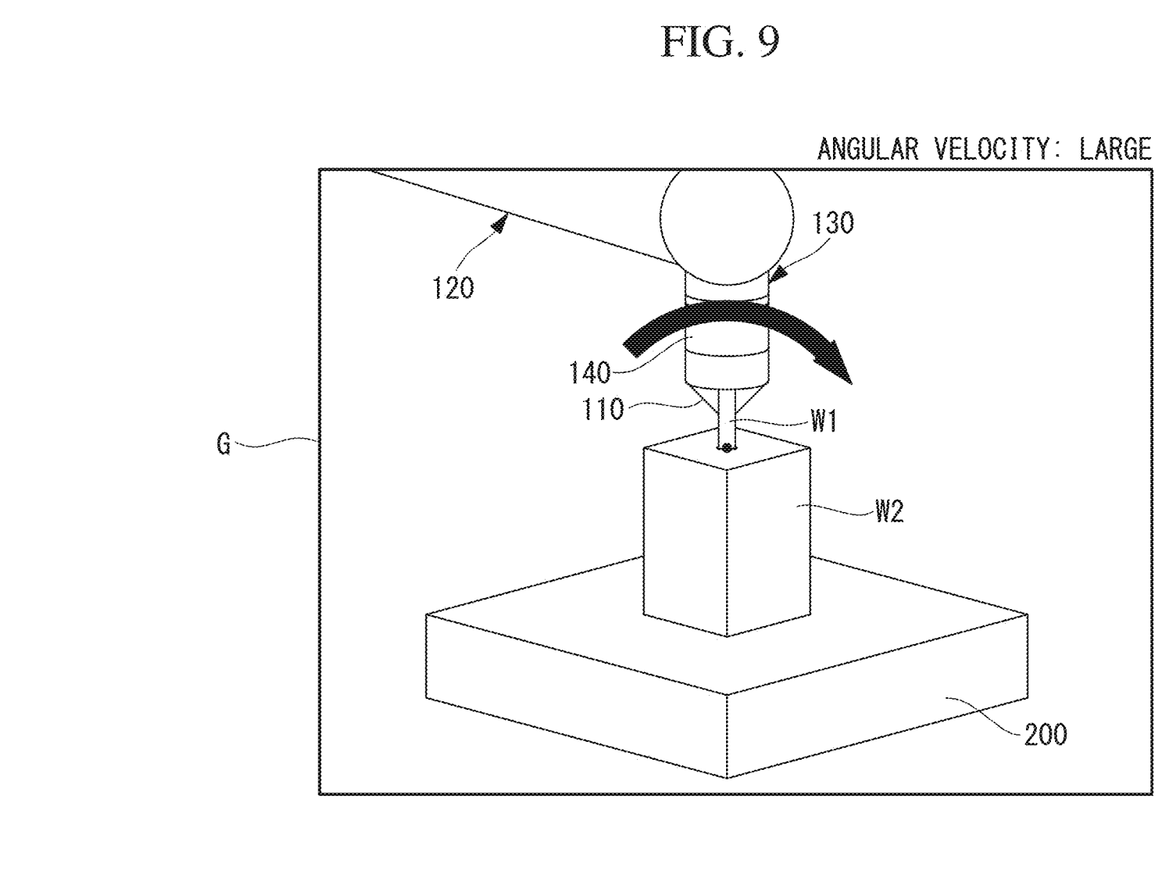
FIG. 9 is another example representation of a case in which the angular velocity shown in FIG. 5 is large.

The magnitude of the velocity or the angular velocity may be expressed by a thickness of the arrow as shown in FIG. 9, or by a color of the arrow, instead of the length of the arrow. FIG. 9 shows an arrow having the same length, thicker than the arrow in FIG. 7, and this indicates that the angular velocity is greater than the example of the FIG. 7.

In a case in which representation is made by colors, by showing the arrow in red or the like, if the velocity or the angular velocity exceeds a predetermined threshold value, an operator is able to intuitively determine that the velocity or the angular velocity is excessive.

As described above, according to the robot controller 1 of this embodiment, not only that the reaction force and the moment acting on the distal end of the first workpiece W1 are shown, but also the velocity or the angular velocity of the robot 100 is shown by an arrow or letters. This provides advantageous effects that it is possible to intuitively and visually recognize the direction of movement and the velocity movement of the robot 100 resulting from the force control of the robot 100, and to easily determine that the robot 100 is properly controlled.

Further, in this embodiment, a reference point TCP on the first workpiece W1 is also shown by overlapping the reference point TCP over the image G. This provides advantageous effects that the operator is able to easily and visually recognize a center of the angular velocity by the reference point, and to easily understand a moving direction of the robot 100.

It should be noted that this embodiment describes that the geometric parameters include the dimensions of the lengths of each link of the robot 100. Instead, however, the geometric parameters may include dimensions of the length and mass of each links. By including the mass, it is possible to obtain the force and the moment at a contact point at which correction to exclude an effect of inertial force from the force and the moment detected by the force sensor 140.

Further, in a case in which a tool that involves a rotational movement such as a nut runner is mounted as a tool, tightening torque may be detected by the force sensor 140 and displayed overlapping on the image of the robot 100.

Moreover, while in this embodiment, the six-axis the force sensor 140 provided between the distal end of the wrist unit 130 and the hand 110 is described as an example of the sensor, the force sensor 140 may be disposed at an arbitrary position, instead. For example, a torque sensor may be arranged on each of the axes, or torque sensors for the three axes and force sensors on the three axes may be separately arranged.

REFERENCE SIGNS LIST

1 Robot controller
2 Operation panel (display)
4 Storage
5 Calculation unit
6 Controller
100 Robot
140 Force sensor (sensor)
TCP Reference point
W1 First workpiece
W2 Second workpiece

The invention claimed is:

1. A robot controller that causes a first workpiece mounted on a distal end of a robot to relatively move with respect to a second workpiece, the robot having a sensor for detecting one of magnitude of force acting on the first workpiece and magnitude of torque acting on the robot, wherein the robot controller is configured to calculate a force acting on a contact point between the first workpiece and the second workpiece and a moment acting on the first workpiece, based on one of the magnitude of the force and the magnitude of the torque detected by the sensor;
    wherein the robot controller comprises:
        a controller configured to carry out force control so that the calculated force and the moment correspond to a predetermined force and a predetermined moment; and
        a display configured to display at least one of a velocity of the first workpiece and an angular velocity around a reference point set for the first workpiece, the velocity and the angular velocity occurring as a result of control by the controller, the one of the velocity and the angular velocity being overlapped on an image of the robot.

2. The robot controller according to claim 1, wherein the display displays a direction of one of the velocity and the angular velocity by an arrow.

3. The robot controller according to claim 2, wherein the display displays a magnitude of one of the velocity and the angular velocity by a length of the arrow.

4. The robot controller according to claim 2, wherein the display displays a magnitude of one of the velocity and the angular velocity by a thickness of the arrow.

5. The robot controller according to claim 2, wherein the display displays a magnitude of one of the velocity and the angular velocity by a color of the arrow.

6. The robot controller according to claim 1, wherein the display displays the reference point overlapped on the image.

7. The robot controller according to claim 1, further comprising:
    a storage configured to store a geometric parameter of the robot, wherein
    the robot controller is configured to calculate the force and the moment using the geometric parameter stored in the storage and a state variable of the robot.

8. The robot controller according to claim 1, wherein the robot controller is configured to calculate the force acting on the contact point between the first workpiece and a chamfered portion of the second workpiece.

9. The robot controller according to claim 1, wherein the reference point is set on the first workpiece.

* * * * *